United States Patent Office 3,228,843
Patented Jan. 11, 1966

3,228,843
ZINC SALT OF OLEFINIC ACID ANTIDANDRUFF PREPARATION
Peter J. Shannon, Nisku, Alberta, Canada, assignor to Shannalta Beauty Products Ltd., Edmonton, Alberta, Canada
No Drawing. Filed Aug. 26, 1963, Ser. No. 304,664
Claims priority, application Canada, Oct. 13, 1960, 808,798
12 Claims. (Cl. 167—87)

This application is a continuation-in-part of my copending application Serial No. 87,103, filed February 6, 1961, which is now abandoned.

This invention relates to a novel composition of matter for the treatment of scalp disorders, such as itching scalp, dandruff, and other bacterial and fungus infections.

In the past, many preparations have been used or suggested for the treatment of superficial fungus infections on other parts of the body with varying degrees of success. Thus, the patent of John C. Baker, No. 2,510,946, issued June 13, 1950, discloses and claims a therapeutic composition characterized by the inclusion of zinc salts of certain unsaturated acids, preferably those containing from six to twelve carbon atoms, in a suitable base.

It is an object of the present invention to provide a more effective composition for treatment of the scalp than preparations presently available.

It is a further object of this invention to provide a composition for the treatment of dandruff.

A specific object of the invention is to provide a composition which is fully compatible with the scalp, causing substantially no irritation when applied in therapeutic amounts upon the scalp of a normally healthy person, and which at the same time tends to enhance the appearance of the hair.

The overall composition according to the present invention comprises two basic constituents, and for convenience of reference they will be referred to separately. The first constituent may comprise a mixture of an olefinic acid having 6 to 12 carbon atoms and a zinc salt of an olefinic acid having 6 to 12 carbon atoms in a water miscible base. This mixture may be referred to hereafter as "the mixture." The second constituent in the composition is a petroleum fraction, preferably petrolatum or a similar substance which would achieve equivalent results in the composition.

Whereas a mixture of an olefinic acid having 6 to 12 carbon atoms and a zinc salt of an olefinic acid having 6 to 12 carbon atoms in a water miscible base has been suggested for the treatment of skin infections, it has now been discovered that when this mixture is blended with petrolatum a new and unusually advantageous composition of matter is formed which, when applied to the scalp of a normally healthy person, will not cause irritation thereto and which is also beneficial to the hair.

Thus, it was found that when the mixture of salt and acid, without petrolatum, was applied to the scalp there was considerable discomfort and in several instances caused blistering of the skin. In one or two instances it seemed to cause headache and intense irritation.

However, it has been found that if the ingredients are mixed in the proportions ranging from 1 part of the mixture and 1 part of petrolatum to 11 parts of the mixture and 16 parts petrolatum, there is a marked improvement in the scalp condition with substantially no undesirable side effects. It has also been found that a composition having a ratio of 3 parts of the mixture and 4 parts of petrolatum (in this example yellow petroleum jelly) is effective and is preferred in use for an average normally healthy person. In most instances, this combination proved effective after only a few applications in the alleviation of dandruff with concomitant improvement in the condition of the hair and scalp.

A more specific example of the complete mixture which may be embodied in the scalp preparation is as follows: an olefinic acid having 6 to 12 carbon atoms, a zinc salt of an olefinic acid having 6 to 12 carbon atoms, a base which may be greasy or a compound of the vanishing cream type, an alkaline agent to neutralize a desired amount of the free acid added so as to adjust the pH to a selected value, which in this invention may range from a pH of about 3 to about 9. An anionic wetting agent may also be added, but this is not necessary.

The olefinic acid having 6 to 12 carbon atoms may be straight or branched chain and may have its double bond anywhere in the chain. The acid may range from omega hexenoic acid on the one hand to alpha beta dodecylenic acid on the other hand. The proportions of the olefinic acid in the mixture may range from about 0.2% to about 10% with a preferred proportion of about 5%. In the preferred embodiment of the invention, undecylenic acid is used.

The zinc salt of an olefinic acid having 6 to 12 carbon atoms could be a zinc salt of any of the foregoing mentioned range of acids. The amount of this ingredient in the mixture could be up to 60% or possibly more.

The carrier of the mixture may be a hydrophilic oil or grease, including saturated or substantially saturated hydrocarbons of which petrolatum is a preferred example, as well as greasy bases of animal or vegetable origin such as coconut oil or lanolin. If desired a mixture of petrolatum and animal sterols, may be used. It may optionally be a vanishing cream type, preferably having a partially saponified stearic acid base, although other bases may be used such as water soluble, high molecular weight substances including the natural gums, tragacanth or acacia, or synthetic materials such as those known commercially as "Carbowax" or methyl cellulose. Other materials which may be used in place of the above ingredients or in conjunction with them include cetyl alcohol and propylene glycol. A strongly alkaline composition such as sodium hydroxide may be added to neutralize a desired amount of the free acid. However, it is preferred to use triethanolamine to give the desired pH range from about 3 to 9 with an appropriate pH being about 6.5 for the preferred embodiment of the invention. The anionic wetting agents which may be used in the mixture if desired are such materials as sodium tetradecyl sulphate, sodium dioctyl sulfosuccinate and commercial aralkyl sulfonate materials known, for example, under the trade names of "Aresklene," "Areskap," "Aresket," and "Nekal," and "Duponal," a long chain aliphatic alcohol sulphate. Water may be added to the above mixture if desired to bring the mixture to a desired usable consistency.

Having discussed the first ingredient of the composition—the mixture—or more specifically the undecylenic acid-zinc undecylenate mixture, the second ingredient, namely petrolatum or like substance will be considered. Petrolatum is a purified mixture of semi-solid hydrocarbons obtained from petroleum or a yellow jelly-like mass, commonly known as petroleum jelly, "vaseline" or paraffin ointment. Although petrolatum has heretofore been used as an ointment base for external application, the blending of specified proportions of petroleum in with the mixture recited above in formulating an agent for treating the scalp is novel with applicant. It has been found that the two ingredients, namely the mixture and the petrolatum, when blended together in specified amounts, is particularly successful in the treatment of scalp disorders, more especially seborrheic dandruff condition.

In preparing the composition of this invention, the olefinic acid-zinc salt mixture is mixed with petrolatum. It was found that the composition may be mixed manually and that stirring rather than beating was preferred. With a beating action too much air is introduced into the composition and a foaming or bubbling composition may result which may be difficult to return to the desired consistency. A temperature of approximately 50 degrees Fahrenheit was used in mixing until uniform blending was obtained. The mixing time would, of course, depend on the volume to be mixed.

The following example is designed to illustrate a preferred embodiment of the composition in accordance with the invention.

Petrolatum is blended with a mixture in the ratio of three parts mixture to four parts petrolatum, the mixture being comprised of the following percentages:

| | Percent |
|---|---|
| Undecylenic acid | 5 |
| Zinc undecylenate | 20 |
| Sodium tetradecyl sulfate | 0.5 |
| Petrolatum | 3 |
| Lanolin | 3 |
| Cetyl alcohol | 10 |
| Propylene glycol | 10 |
| Triethanolamine to adjust the pH to 6.5 | 2 |
| Water q.s. | |

The undecylenic acid, an olefinic acid, is preferred for the drying quality as well as the advantageous effects of the acid on a diseased scalp. The acid is neutralized by the adjustment of pH to give a pH of 6.5 by the triethanolamine forming with the acid a water soluble salt. The triethanolamine acts to make the composition more readily dissoluble in use than the zinc undecylenate as well as acting to neutralize a desired amount of the free acids. A stronger alkaline composition could be arrived at if desired by using a sodium hydroxide base. The sodium tetradecyl sulphate mentioned above is an anionic wetting agent and aids in giving a uniform consistency. Alternative anionic wetting agents could be used. The propylene glycol, petroleum, lanolin and cetyl alcohol of the mixture are additions for a suitable consistency for application to the skin and also contain healing qualities suitable to the purpose intended.

The above mentioned ingredients plus the water miscible base act to prevent the concentration of acids from causing irritation. Additionally it may be noted that petrolatum as a lubricant mixes well with the lubricating qualities of the zinc salts of the olefinic acid. Alternatives could be used for dilution of strength desired.

This blend may be formulated replacing a portion of the petrolatum with a vanishing cream base if desired. Such a base has a character and odor more acceptable to some users, particularly women, than that of petrolatum or lanolin. In addition, if desired, the product may be suitably scented with perfume bases such as are used in soaps and cosmetic preparations.

Ordinarily, yellow petrolatums will be used as this form has been found to be most effective. However, the more refined or "white" product may be substituted in those applications when the colored form may be objectionable for esthetic or other reasons.

Instead of undecylenic acid, other unsaturated aliphatic acids, both straight and branched chains, may be used, including for example, alpha-beta hexanoic acid $$(CH_3(CH_2)_2CH\!=\!CHCOOH)$$

and omega hexanoic acid $(CH_2\!=\!CH(CH_2)_3COOH)$. With more acidic substances, a greater proportion of inert base is indicated.

What is claimed is:

1. A therapeutic composition consisting essentially of (1) a mixture containing an olefinic acid having 6 to 12 carbon atoms, a zinc salt of an olefinic acid having 6 to 12 carbon atoms in a water miscible base, and (2) petrolatum blended with said mixture in a ratio between approximately one part mixture and approximately one part petrolatum to approximately eleven parts mixture and approximately sixteen parts petrolatum.

2. A therapeutic composition consisting essentially of (1) a mixture containing an olefinic acid having 6 to 12 carbon atoms, a zinc salt of an olefinic acid having 6 to 12 carbon atoms in a vanishing cream base buffered to pH 6.5 with triethanolamine and (2) petrolatum blended with said mixture in a ratio between approximately one part mixture and approximately one part petrolatum to approximately eleven parts mixture and approximately sixteen parts petrolatum.

3. A composition according to claim 1 wherein the olefinic acid is undecylenic acid.

4. A composition according to claim 1 wherein the zinc salt is zinc undecylenate.

5. A therapeutic composition according to claim 1 wherein the water miscible base comprises an oily carrier, an alkaline reagent capable of adjusting the pH of the composition in the range of from approximately 3 to approximately 9, and an anionic wetting agent.

6. A therapeutic composition consisting essentially of (1) a mixture containing undecylenic acid, zinc undecylenate, an oily carrier, an alkaline reagent capable of adjusting the pH of the composition in the range of from approximately 3 to approximately 9, and an anionic wetting agent, and (2) petrolatum blended with said mixture in a ratio between approximately one part mixture and approximately one part petrolatum to approximately eleven parts mixture and approximately sixteen part petrolatum.

7. A therapeutic composition consisting essentially of (1) a mixture containing undecylenic acid, zinc undecylenate, an oily carrier, triethanolamine, cetyl alcohol, and propylene glycol and (2) petrolatum blended with said mixture in a ratio between approximately one part mixture and approximately one part petrolatum to approximately eleven parts mixture and sixteen parts petrolatum.

8. A therapeutic composition consisting essentially of (1) a mixture containing 5% undecylenic acid, 20% zinc undecylenate, 0.5% sodium tetradecyl sulfate, 3% petrolatum, 3% lanolin, 10% cetyl alcohol, 10% propylene glycol, triethanolamine to adjust the pH to 6.5 and water q.s., and (2) petrolatum blended with said mixture in a ratio between approximately one part mixture and one part petrolatum to approximately eleven parts mixture and sixteen parts petrolatum.

9. A therapeutic composition consisting essentially of (1) a mixture containing 5% undecylenic acid, 20% zinc undecylenate, 0.5% sodium tetradecyl sulfate, 3% petrolatum, 3% lanolin, 10% cetyl alcohol, 10% propylene glycol, triethanolamine to adjust the pH to 6.5 and water q.s., and (2) petrolatum blended with said mixture in the ratio of approximately 3 parts of the mixture to approximately four parts petrolatum.

10. A therapeutic composition for the treatment of dandruff consisting essentially of (1) a first mixture containing an olefinic acid having from 6 to 12 carbon atoms, a zinc salt of an olefinic acid having from 6 to 12 carbon atoms in a water miscible base and (2) a second mixture consisting of petrolatum and vanishing cream, the proportions of said first mixture to said second mixture being within the ranges of 1:1 to 11:16.

11. A therapeutic composition for application to the scalp consisting essentially of (1) a first mixture containing undecylenic acid, zinc undecylenate, an oily carrier, triethanolamine, cetyl alcohol, and propylene glycol and (2) a second mixture consisting of petrolatum and vanishing cream, the proportions of said first mixture to said second mixture being within the ranges of 1:1 to 11:16.

12. A therapeutic composiltion for topical treatment of the scalp consisting essentially of (1) a mixture containing 5% undecylenic acid, 20% zinc undecylenate, 0.5% sodium tetradecyl sulfate, 3% petrolatum, 3% lanolin, 10% cetyl alcohol, 10% propylene glycol, triethanolamine to adjust the pH to 6.5 and water q.s., and (2) a second mixture consisting of petrolatum and vanishing cream in the ratio of approximately 3 parts of the first mixture to approximately 4 parts of the second mixture.

References Cited by the Examiner
UNITED STATES PATENTS

| 2,510,946 | 6/1950 | Baker | 167—63 XR |
| 2,680,088 | 6/1954 | Reiner | 167—63 XR |

JULIAN S. LEVITT, *Primary Examiner.*

VERA C. CLARKE, *Assistant Examiner.*